United States Patent Office 3,377,039
Patented Apr. 9, 1968

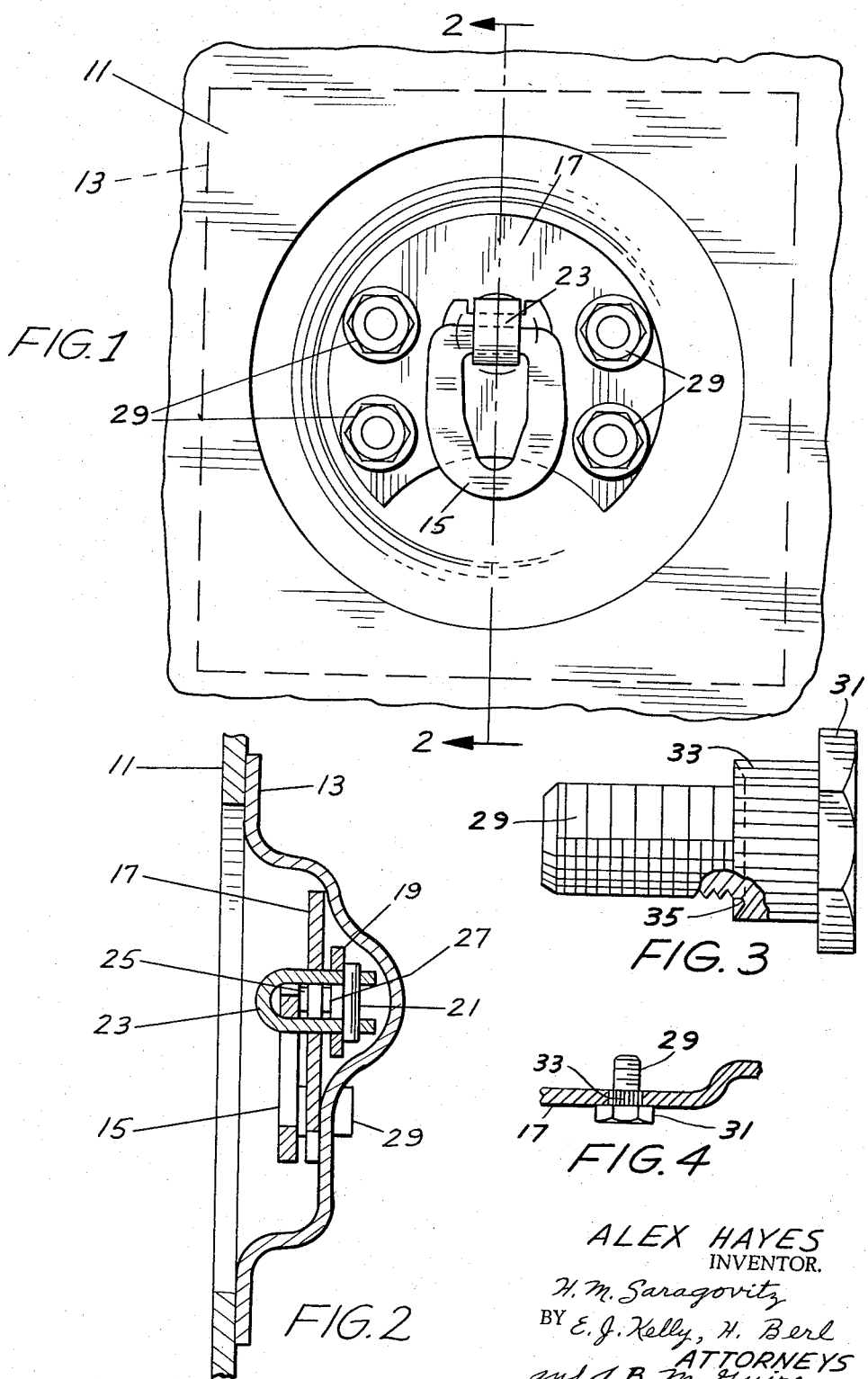

3,377,039
TIEDOWN ANCHOR
Alex Hayes, Warren, Mich., assignor to the United States of America as represented by the Secretary of the Army
Filed June 16, 1966, Ser. No. 559,060
6 Claims. (Cl. 248—119)

ABSTRACT OF THE DISCLOSURE

A tiedown anchor for securing cargo lines, belts, and the like in vehicles. The anchor has substantially eliminated the creation of noise and does not obstruct cargo entry and removal from the cargo storage area by means of spring-biasing the anchor and installing it in a recess in the wall of the cargo storage area. The anchor is rotatably mounted to eliminate the creation of stress.

---

The invention described herein may be manufactured and used by or for the Government for governmental purposes without the payment to me of any royalty thereon.

This invention relates to tiedown anchors and more particularly to tiedown anchors for securing cargo in place. Such anchors may be used in warehouses, boxcars, trucks, or other suitable cargo storing or transporting means.

In the storage and shipment of cargo, it is often important to ensure that it is secured in place to avoid spillage, damage, etc. It has been the practice to secure the cargo by means of straps which are attached to anchors which have been fixed upon walls, truck sides, and similar places.

Prior cargo tiedown anchors, especially on vehicles, have not been satisfactory in all circumstances. It has been found that many such anchors protrude into the lading space so as to interfere with the easy movement of materials in an out of the space. Additionally, many anchors which do not protrude into the space are difficult to work with in attaching a lading binder. Many anchors of a type similar to that herein described, when not in use, create a great amount of noise in a moving vehicle by hitting against the vehicle body or else must be secured in place by an awkward rotational movement. If the anchors are free to move when not in use, they create electrical charges which cause micro-arcing in any electronic system the truck passes near.

It is an object of the present invention to obviate each and all of the above objections to prior anchors.

It is also an object of the invention to provide a new, useful, and improved cargo tiedown anchor.

It is a further object of this invention to provide a cargo tiedown anchor which is suitable for use on vehicles upon which it is important to have low noise levels so as to reduce driver fatigue and where it is important not to betray the position of the vehicle in a tactical area or create micro-arcing in electronic devices such as used in missile tracking and control systems.

It is also an object of the present invention to provide an anchor which is water-tight with respect to a vehicle exterior and protected from the elements so as to allow use upon open trucks such as a flatbed truck with low sidewalls.

Other objects of the invention will become apparent to those skilled in the art during the course of the following description which is intended to be illustrative only and is not intended to restrict or limit the scope of the invention.

In the drawings,

FIGURE 1 shows a plan view of the cargo tie-down anchor of the instant invention.

FIGURE 2 shows a sectional view of the anchor taken on line 2—2 of FIGURE 1.

FIGURE 3 is a view of a fastening means utilized in fastening the cargo tiedown anchor to the storage area wall.

FIGURE 4 shows a sectional view of a bolt affixed in a retainer plate for proper mechanical connection of the major elements of the invention.

Briefly, in accordance with the invention, a tiedown anchor has been provided having a hasp which extends through and is movably secured to a backing plate so as to enable an eye which is rotatably fixed to the hasp to be oriented in the direction of the force being withstood by the anchor. The eye is biased into engagement with the hasp by means of biasing springs placed on opposite sides of the backing plate.

Referring now to FIGURES 1 and 2 in detail, there is shown the wall 11 of a container such as a boxcar, truck, etc. in which an opening is formed.

Fixed to the outside of the wall and over the opening is a saucer-shaped retainer plate 13. This plate may be of any suitable material depending upon the material of wall 11.

Attached to retainer plate 13 by means of suitable bolts 29 is a base plate 17. Obviously, plates 13 and 17 could be welded together but the bolts 29 allow for easier assembly and repair.

FIGURE 3 shows a type of bolt which may be easily utilized to fasten the working parts of the anchor to the retainer plate 13. Bolt 29 is formed with a standard hex head 31 and an integral coller 33 which is machined to have a straight knurl in the longitudinal, or axial, direction. At the end of the collar adjacent the threads, an undercut is formed at an angle of approximately 25° to a plane which is perpendicular to the bolt axis and which passes through the base of the undercut. The bolt 29 is passed through a press fit hole in plate 13 until the head 31 abuts the plate 13. A die (not shown) is placed over the threaded portion of the bolt so as to abut the collar. Sufficient pressure is then exerted on the die so as to cause the metal of the collar to expand against the hole in plate 13 while flowing into the undercut and the knurl recesses, as shown in FIGURE 4. Thus, the bolts become fixed in plate 13 and the base plate 17, which is properly bored to receive the bolts, is placed over the bolts and fastened by standard hex nuts.

The described method of securing the bolts to the retainer plate provides a means to utilize anchors which do not protrude into the cargo area, can be utilized on a thin-walled vehicle, and do not allow water to pass through the vehicle walls into the cargo area.

A bifurcated hasp 23 extends through an opening in base plate 17 and a pin 21 extends through co-axial, press-fit holes in the legs of said hasp between plates 13 and 17. The legs of the hasp also are inserted through the center hole of a washer 19 in such a way that pin 21 serves to hold the washer on the legs.

Fixed between plate 17 and washer 19 is a flat spring 27 which serves to bias the hasp, pin, and washer toward retainer plate 13, i.e., to the right in FIGURE 2.

On the opposite side of plate 17, an eye 15 is straddled by the legs of hasp 23 so that eye 15 is free to move in a variety of directions while being restrained from removal from the assembly by the hasp. Note that the hasp can be revolved in a clockwise direction for approximately 175° in the plane of the drawing in FIGURE 2 and can be revolved 360° in either direction in the plane of the drawing in FIGURE 1.

In order to retain the eye in the position shown in FIGURE 2 when not in use, a flat spring 25 is fixed between the eye and base plate 17. This spring biases eye 15 in the direction opposite to that in which hasp 23 is biased so that the spring and hasp hold the eye in a fixed position. Thus, the eye is prevented from knocking against any material and creating noise or electrical charges in a moving vehicle while, at the same time, being readily available for use.

In order to use the anchor, it is merely necessary for the cargo handler to raise the eye slightly and insert a hook or line. When the lading strap or line is tightened, the eye turns and causes the hasp to swivel so that the eye assumes a colinear position with the strap or line. Upon release, the eye will be biased into the position shown in FIGURE 2 by the springs providing the eye 15 is located at an angle of 45° or less with respect to the backing plate 17. If the angle of displacement is between 45° and 90°, a slight force must be exerted on eye 15 to cause it to assume the position shown in FIG. 2.

It is understood that the above description of the invention shows only an illustrative embodiment and that various changes in size, shape, and arrangement of parts may be resorted to without departing from the spirit of the invention or the scope of the claims.

I claim:

1. A cargo tiedown anchor for mounting on a vehicle or warehouse wall comprising,
   a backing plate,
   a hasp extending through said backing plate and rotatably secured thereto such that a portion of said hasp extends on either side of said backing plate,
   an eye rotatably mounted on said hasp for attaching a lading strap, and
   first and second biasing springs,
   said hasp is biased away from the cargo storage area by means of said first spring reacting on said backing plate,
   said second spring being located intermediate said backing plate and a portion of said eye whereby said eye is biased toward the cargo storage area,
   said hasp and said eye being rotatably mounted to enable the eye to be colinear with the direction of force exerted on the eye.

2. The cargo tiedown anchor of claim 1 and means for mounting said anchor comprising a retaining plate fixedly attached to the exterior of a wall of the cargo storage area, said backing plate being stationarily fixed to said retaining plate.

3. The combination of claim 2 further comprising mounting bolts affixed to said retaining plate wherein each mounting bolt has an integral collar thereon which has an undercut surface at the end thereof adjacent the bolt threads and has longitudinal knurl recesses on the exterior of said collar.

4. The combination of claim 3 wherein said bolts are affixed to said retaining plate by compression of the metal of said coller so as to fill in said longitudinal knurl recesses after insertion of said bolts into pre-bored holes in said retaining plate.

5. A cargo tiedown anchor for use in storing cargo within the interior surface of storage walls comprising,
   a saucer-shaped retaining plate mounted on the exterior surface of said storage walls,
   a backing plate stationarily mounted within the concave portion of said retaining plate,
   a hasp extending through and movably secured to said backing plate such that a portion of said hasp extends on either side of said backing plate,
   an eye rotatably mounted on said hasp for attaching a lading strap and
   first and second biasing springs,
   said first biasing spring being mounted intermediate said backing plate and the concave surface of said retaining wall and reacting with said backing plate so as to bias said hasp away from said cargo storage area,
   said second biasing spring being mounted intermediate said backing plate and a portion of said eye whereby said eye is biased toward the cargo storage area,
   said eye being rotatably mounted on said hasp such that said eye is located intermediate the concave surface and a plane including the outer surface of said storage wall when the eye is in the stored position.

6. A cargo tiedown anchor as set forth in claim 5 further comprising a mounting bolt affixed to said retaining plate including
   an integral collar thereon which has an undercut surface at the end thereof, and
   longitudinal knurl recesses on the exterior of said collar.

References Cited

UNITED STATES PATENTS

| Re. 19,337 | 10/1934 | Butterworth. |
| 914,327 | 3/1909 | Barbour. |
| 2,047,503 | 7/1936 | Wilson et al. |
| 2,052,914 | 9/1936 | Williams _____ 248—119 XR |
| 2,688,504 | 9/1954 | Parker _____ 248—361 XR |
| 3,021,799 | 2/1962 | Oakley _____ 105—369 |
| 3,093,887 | 6/1963 | Prestige et al. |
| 3,241,501 | 1/1964 | Watts _____ 248—361 XR |

ROY D. FRAZIER *Primary Examiner.*

ROBERT P. SEITTER, *Assistant Examiner.*